United States Patent [19]

Pollier

[11] Patent Number: 5,383,534
[45] Date of Patent: Jan. 24, 1995

[54] MAGNETIC COLLECTOR FOR LUBRICATION SYSTEMS

[76] Inventor: James D. Pollier, 1977 Jefferson Blvd., Windsor, Ontario, Canada, N8T 2W1

[21] Appl. No.: 141,008

[22] Filed: Oct. 26, 1993

[51] Int. Cl.6 .................. F01M 1/10; B01D 35/06
[52] U.S. Cl. .................. 184/6.25; 184/109; 210/222
[58] Field of Search .................. 184/6.25; 210/222

[56] References Cited

U.S. PATENT DOCUMENTS

| | | |
|---|---|---|
| 1,535,618 | 4/1925 | Mayer . |
| 1,806,001 | 5/1931 | Simms et al. . |
| 2,032,800 | 3/1936 | Haltenberger . |
| 2,345,029 | 3/1944 | Brooks . |
| 2,358,612 | 9/1944 | Acker . |
| 2,599,966 | 6/1952 | Zachary . |
| 2,683,618 | 7/1954 | Long . |
| 2,755,932 | 7/1956 | Cohn . |
| 2,877,899 | 3/1959 | Hutchins et al. . |
| 3,083,813 | 4/1963 | Lusher . |
| 3,800,914 | 4/1974 | Miyata .................. 184/6.25 |
| 4,995,971 | 2/1991 | Droste et al. .................. 210/222 |

FOREIGN PATENT DOCUMENTS

| | | | |
|---|---|---|---|
| 811474 | 4/1937 | France .................. | 210/222 |
| 4326908 | 11/1992 | Japan .................. | 210/222 |
| 307547 | 3/1929 | United Kingdom .................. | 210/222 |
| 861078 | 2/1961 | United Kingdom .................. | 210/222 |
| 1375842 | 2/1988 | U.S.S.R. .................. | 184/6.25 |

*Primary Examiner*—Thomas E. Denion
*Attorney, Agent, or Firm*—Bereskin & Parr

[57] ABSTRACT

An elongate flexible magnetic member collects metallic debris from lubrication fluids, such as oil, in lubrication systems associated with motors. In one embodiment, the member is attached at one end to a swivel, which is in turn attached to a drain plug. The drain plug is threaded into and sealed to an oil pan drain hole. The elongate flexible magnetic member has a magnetic surface that positions the member in the lubrication system and attracts metallic particles. In a second embodiment, the magnetic member is held in a loop by a flexible retainer. The retainer is connected at one end to the swivel. In a third embodiment the member may be attached to the oil intake portion of the oil pump. In a further embodiment a method of evaluating engine part misalignment is provided.

16 Claims, 5 Drawing Sheets

MAGNETIC COLLECTOR FOR LUBRICATION SYSTEMS

FIELD OF THE INVENTION

The present invention relates to magnetic collectors of the type capable of attracting fine metal particles. In particular this invention relates to magnetic collectors which may be used to separate fine metal particles from a fluid, such as a lubricant or the like.

BACKGROUND OF THE INVENTION

Internal combustion engines of all types are presently made primarily from metal components, many of which are in sliding metal-to-metal contact with each other. These include pistons contacting cylinder bores, camshaft lobes contacting lifters, rocker arms contacting valve stems, and distributor gears contacting camshafts.

To increase the efficiency of such engines it is important to reduce friction losses occurring at such sliding contact points so that the fuel energy is directed to producing output horsepower rather than in overcoming friction. To reduce friction, lubrication is usually used. Many such engines contain separate lubrication systems for ensuring the proper delivery of lubricants to the components having sliding metal contact. Such lubrication systems typically include a reservoir having a sump, an oil pump and a conduit system for delivering and returning the lubricating fluid to the moving parts of the engine.

Notwithstanding such lubrication, over time the components tend to wear. Much of this wear occurs during engine startup when the oil pressure is low. The engine components are not properly lubricated and engine wear occurs. Such wear creates fine metal particles which are washed down into the reservoir as the lubricant circulates through the system. As the particle-laden lubricant is drawn through the oil pump, the particles cause damage to the pump gears and cause even further wear. The lubricant is then normally delivered to a filter to be cleaned. However, when the lubricant temperature is low and the viscosity high, or when the engine is operating above an idle condition, a portion of the lubricant will bypass the filter. This unfiltered particle-laden lubricant will cycle directly through the crankshaft main journals, the connecting rod journals, the camshaft and lifters, the pushrods and rocker assemblies, and then back to the reservoir. The unfiltered lubricant impregnates the surface of the aluminum bearings with metal particles to cause the journals to wear. As a result, the life expectancy of the rotating assemblies and camshafts is greatly reduced.

To try to overcome this cycle of damage, various forms of magnetic collectors have been proposed in the past for use in separating metal particles from the lubricant as it passes through the reservoir.

Examples of prior magnetic collectors are provided in U.S. Pat. No. 1,806,001 (Simms et al), U.S. Pat. No. 2,032,800 (Haltenberger), U.S. Pat. No. 2,358,612 (Acker), U.S. Pat. No. 2,345,029 (Brooks) and U.S. Pat. No. 2,877,899 (Hutchins et al). These collectors commonly feature rigid magnets, such as bar magnets and horseshoe magnets, that are at least partially submerged within the lubricant. This submergence typically takes place in the reservoir, but at some distance from where the lubricant collects immediately prior to being taken up and pumped through the oil pump. A common failing of these prior magnetic collectors is that they show a magnetic field which is very limited, in the sense that it is only in effect over a small portion of the lubricant reservoir. Particles suspended in the fluid which pass outside of these limited magnetic fields of the prior art are simply not extracted. Locating the limited magnetic field a distance from the lubricant sump and intake leading to the pump also limits the prior designs' effectiveness.

An example of a magnetic collector having a slightly expanded magnetic field is provided by U.S. Pat. No. 2,755,932 (Cohn). The Cohn patent provides two or more bar magnets that are pivotally connected to the stem of a reservoir drain plug. When the plug is inserted into the reservoir the ends of the bar magnets repel each other causing the free ends of the bar magnets to pivot away from each other. While this arrangement is an improvement over the earlier described magnetic collectors, it still produces only a very limited magnetic field which is centralized about the reservoir drain plug. As before, the plug is typically located a distance from the oil uptake of the oil pump, so that much of the lubricating fluid can pass by the bar magnets without coming into close enough contact with the magnetic field created by the bar magnets for the metallic particles to be captured. Further, the ends of the magnet tend to be attracted to the oil pan itself, and this effect distorts the magnetic field further reducing the effectiveness of this prior device in removing particles. Thus, while perhaps slowing down somewhat the rate of wear damage caused by the metal particles, such wear damage is not effectively controlled by this prior design.

Using the drain plug as a place to introduce a magnetic extractor is problematic. The drain plug is typically located at the lowest point in the reservoir, at a position where the reservoir is quite wide. The introduction of a point source magnet into the lubrication system at a point where the flow is wide means that a substantial portion of the flow can pass by without being purified of metal debris, making the particle collection ineffective. What is needed is a collector that permits a magnetic field to be located at a predetermined position within a lubricant reservoir in such a manner that the magnetic field extends broadly to effectively comb the lubricant before it enters the oil pump intake. Such a collector could collect a substantial portion of the particles to prevent unnecessary damage to the internal machine elements and to effectively control the wear damage caused by such free metal particles. Such a collector should also be easily removable for inspection to allow a determination of how much metal debris is being collected to indicate how much wear there is. Thus, the collector can be used as a diagnostic tool to evaluate when to perform realignment of the components before the wear reaches such an extent that excessive permanent damage occurs.

SUMMARY OF THE INVENTION

In one aspect the present invention provides a magnetic collector for insertion into a liquid reservoir of a lubrication system, said magnetic collector comprising:

a flexible member having a magnetic surface that attracts metallic particles;

support means for removably supporting said flexible member in said liquid reservoir; and a swivel for connecting one end of said flexible member to said support means, said swivel permitting free rotation of said support means relative to said flexible member.

Advantageously, the flexible magnetized member of the magnetic collector is adapted for positioning the magnetic field adjacent to a lubricant intake. This arrangement helps to collect metallic particles before they enter the intake and damage the internal machine elements. Furthermore, the swivel permits the support means (such as a drain plug) to be inserted into the reservoir without disturbing the position of the flexible member.

In another aspect, the present invention provides an oil pump intake comprising:

a hollow housing having an upper and a lower surface, said lower surface defining an oil intake port;

a conduit for fluidly connecting said housing to an oil pump, said conduit receiving oil flow from said oil intake port; and a magnetized member extending along at least a portion of the perimeter of said lower surface of said housing, said magnetized member forming a magnetic field that extends across said intake port; wherein said housing is adapted to be submerged within the oil contained within an oil reservoir.

Advantageously, the magnetized perimeter of the intake housing helps to collect metal particles before they enter the intake and damage the internal machine elements.

In another aspect the present invention provides a method of detecting misalignment of motor components, said method comprising:

inserting a magnetic member into a lubricant reservoir associated with said motor;

positioning said magnetic member in said lubricant reservoir to rest below and to at least partially surround a lubricant intake port associated with an oil pump;

allowing said motor to be in use and at rest for alternate periods of time;

removing said magnetic member from said reservoir;

inspecting said magnetic member for metallic debris; and evaluating said motor for misalignment.

BRIEF DESCRIPTION OF THE DRAWINGS

For a better understanding of the present invention and to show more clearly how it may be carried into effect, reference will now be made, by way of example only, to the accompanying drawings. The drawings show preferred embodiments of the present invention, in which.

DETAILED DESCRIPTION OF THE PREFERRED EMBODIMENT

A magnetic collector in accordance with a preferred embodiment of the present invention is shown generally at 10 in FIGS. 1–9.

In a first aspect of the invention, the magnetic collector 10 comprises a magnetic drain plug. A first embodiment of the magnetic drain plug is shown generally at 12 in FIGS. 1–4. A second embodiment of the magnetic drain plug is shown at 13 in FIGS. 5 and 6.

Figure 7:
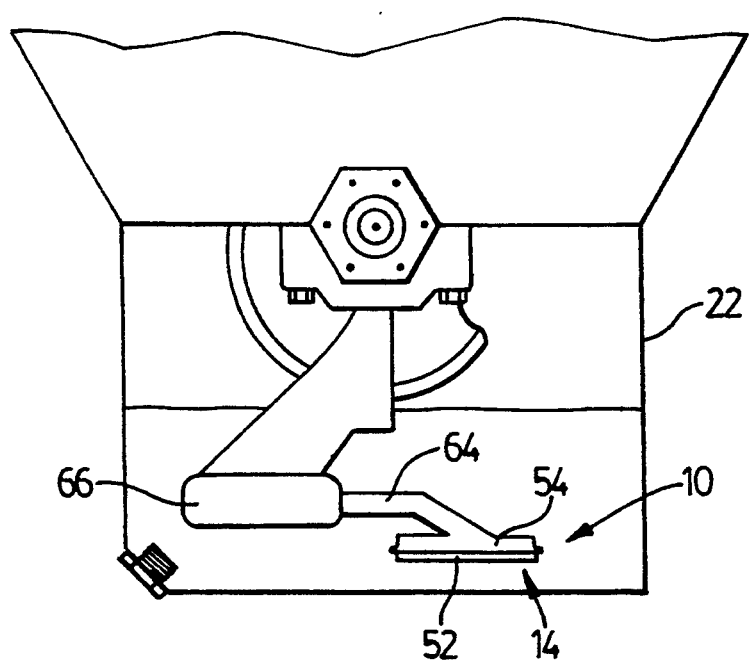
FIG. 7 is a side view of an oil reservoir containing an oil pump and a magnetic oil pump intake in accordance with the present invention.
Figure 8:
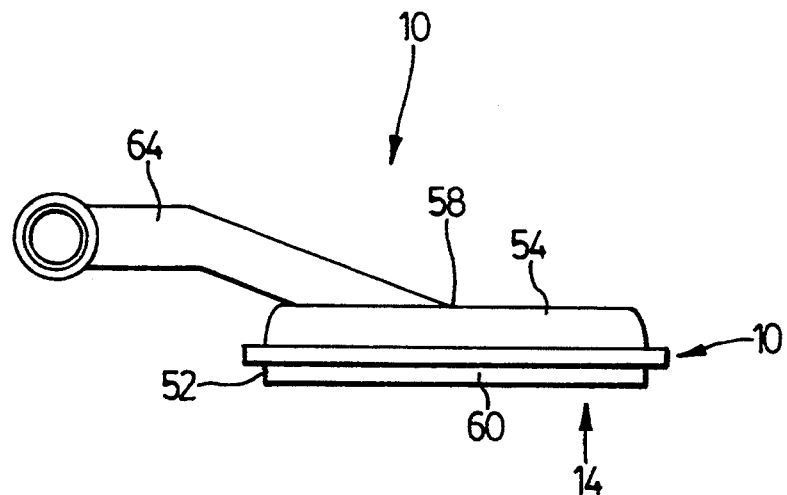
FIG. 8 is an isolated side view of the magnetic oil pump intake of FIG. 7.
Figure 9:
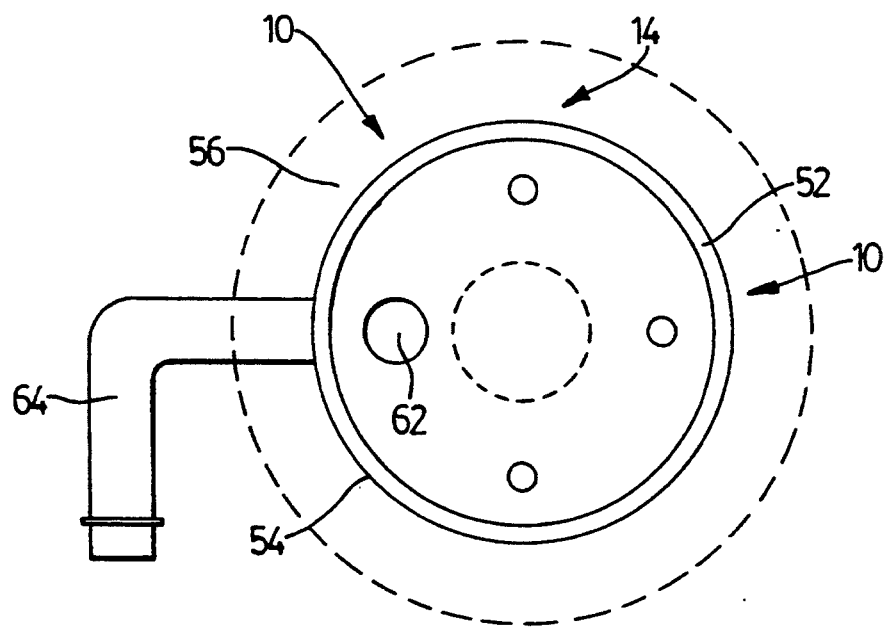
FIG. 9 is a bottom view of the magnetic oil pump intake of FIG. 8.

In a second aspect of the invention, the magnetic collector 10 comprises a magnetic oil pump intake shown generally at 14 in FIGS. 7–9.

MAGNETIC DRAIN PLUG

Referring to FIGS. 1–4, the first embodiment 12 of the magnetic drain plug is comprised of an elongate flexible magnetized member 16. The flexible member 16 is preferably formed from a flexible magnet such as is sold under the trade mark NITRIL. The flexible member 16 is generally flexible at room temperatures and thus may be formed into a curve, or stretched out straight easily by hand without the need for any special tools or the like. The member 16 is arranged in a thin strip, with at least two generally opposed flat sides 16a and 16b of like magnetic attractive poles. The sides 16a and 16b provide magnetized surfaces that are attracted to metallic objects or particles.

One end of the flexible magnet 16 is preferably connected by means of a swivel 18 to a drain plug 20. The drain plug 20 acts as a support means for supporting the flexible member 16 in a liquid reservoir 22 (shown in FIG. 3) such as may be used to contain oil for an internal combustion engine.

The drain plug 20 is typically threaded and includes a gasket 26 for sealing a correspondingly threaded opening 27 (shown in FIG. 3) defined in the reservoir 22. The swivel 18 is provided to permit free rotation of the drain plug 20 about a longitudinal axis relative to the flexible member 16. The drain plug 20 can thus be threaded into the reservoir opening 27 without disturbing (by rotation) the position of the flexible member 16. The advantage of this is described below in greater detail.

Because the member 16 is flexible, it is able to conform to surface variations in the reservoir 22, as required. For example, the typical reservoir 22 for an automobile is formed from a metal, such as steel, that attracts the member 16. Thus the flexible member 16 of the present invention can be inserted into the drain hole 27 where one of its sides 16a, 16b will be attracted to the metallic surface of the reservoir 22. As more of the flexible member 16 is inserted into the drain hole 27 the member will tend to be pushed to the opposing edge of the reservoir 22.

Figure 1:
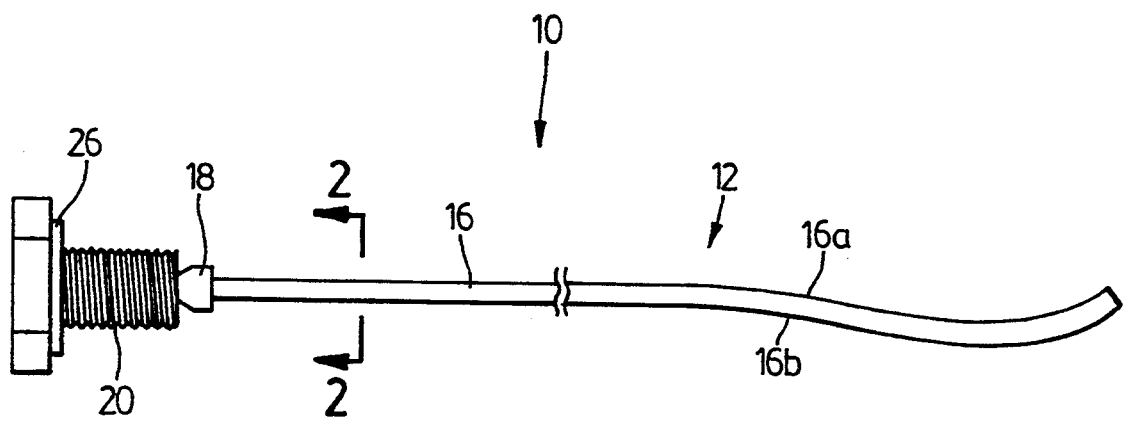
FIG. 1 is a side view of a first embodiment of a magnetic collector in accordance with the present invention.
Figure 2:
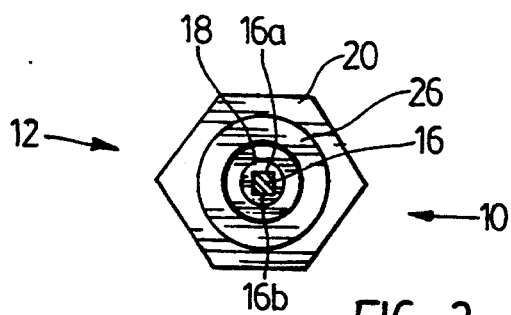
FIG. 2 is a sectional view of the magnetic collector of FIG. 1, taken along lines 2—2.
Figure 3:
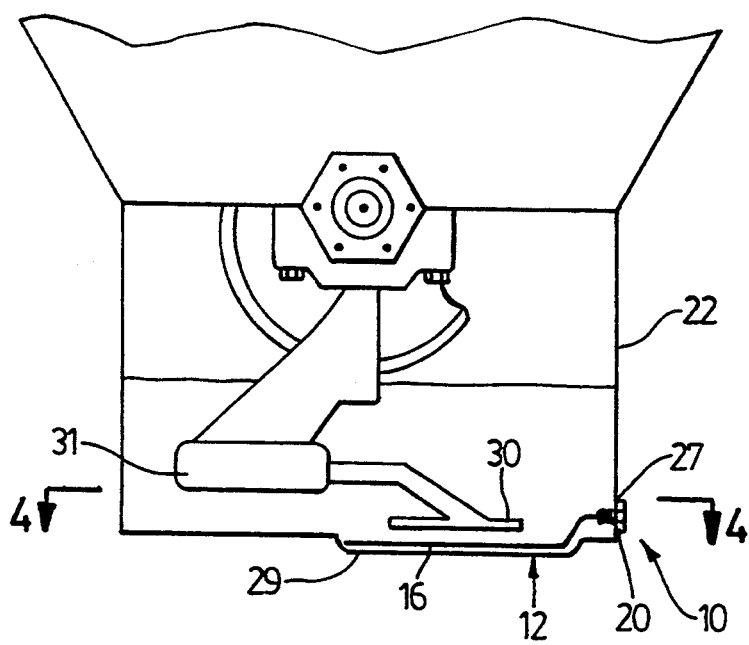
FIG. 3 is a side view of an oil reservoir containing an oil pan and the magnetic collector shown in FIG. 1.
Figure 4:
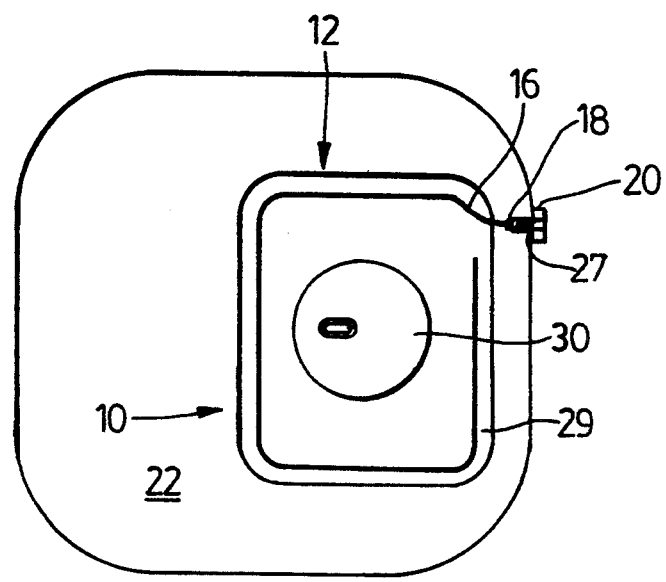
FIG. 4 is a sectional view of the oil reservoir of FIG. 3 taken along lines 4—4.

Most drain pans 22 are formed with a sump area, such as is shown at 29 in FIGS. 3 and 4. The sump area 29 comprises a depression defined in the reservoir 22 generally beneath an oil intake 30 to the oil pump 31. The sump area 29 has generally curved side edges that provide a ready guide for positioning the flexible member 16 when it is being inserted into the reservoir. As the flexible member 16 is inserted into the reservoir 22 one of its sides 16a, 16b will contact and then follow the side edges of the sump area 29. In the most preferred form of the invention the flexible member 16 is of sufficient length to follow the perimeter of the sump area 29 in substantially a complete circle. In this way, the oil entering intake 30 will be combed of magnetic particles, regardless of what direction the oil crosses the sump area 29. While it may be difficult to remove all of the suspended metallic particles from the oil, the instant invention has been found to be substantially effective in removing most of such particles.

It will be appreciated that satisfactory results may be achieved where the flexible member 16 extends to the opposite side of the sump area 29 from the drain plug 20. A good portion of the oil flowing over the flexible member 16 to the oil intake 30 will be effectively combed of metallic particles since the oil is forced to flow through the effective zone of the magnetic field of the flexible member 16. The effective zone in this sense is that portion of the magnetic field that is sufficiently strong to overcome any viscosity effects which otherwise would inhibit the movement of the metallic particles towards and onto the flexible member 16.

Figure 5:
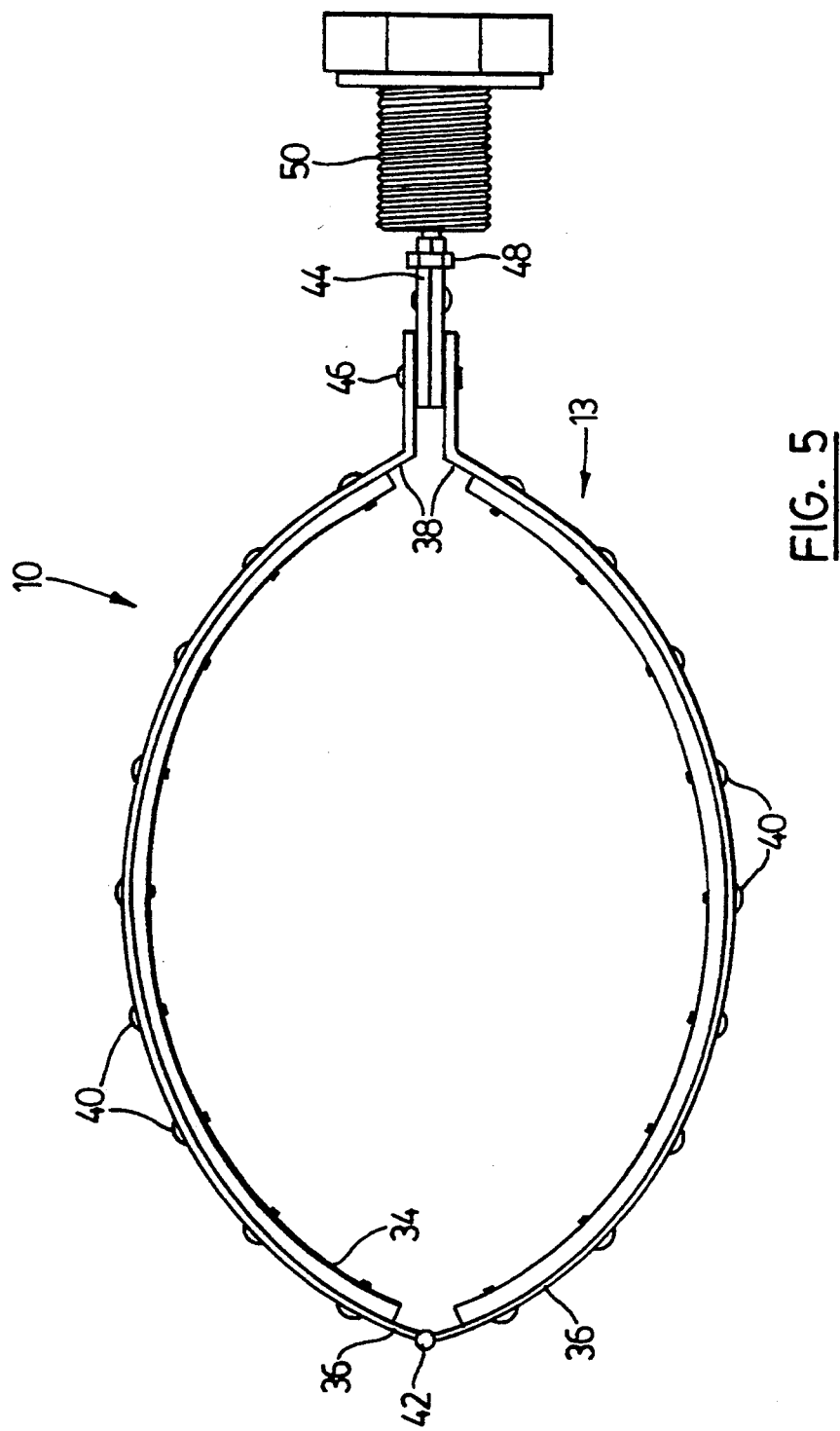
FIG. 5 is a top view of a second embodiment of a magnetic collector in accordance with the present invention.
Figure 6:
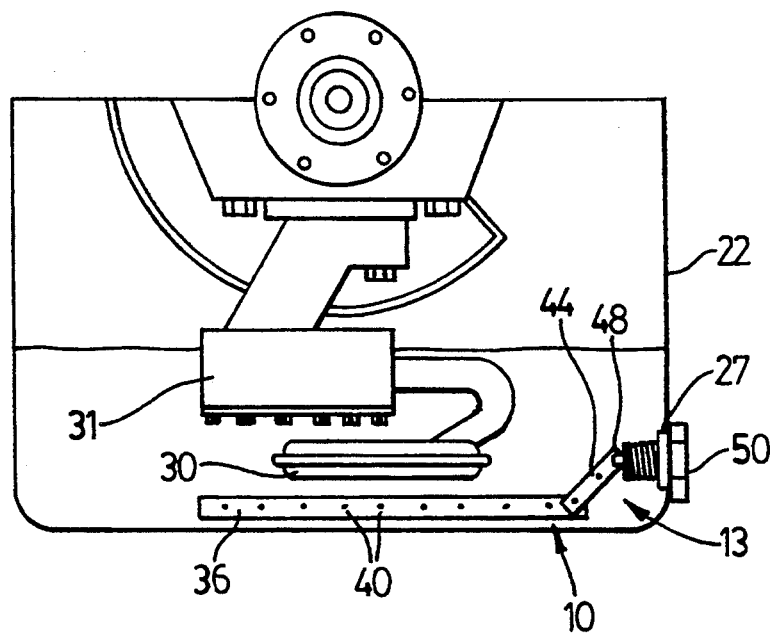
FIG. 6 is a side view of an oil reservoir containing an oil pan and the magnetic collector of FIG. 5.

Referring to FIGS. 5 and 6, the second embodiment 13 of the magnetic drain plug is shown. In this embodiment, an elongate magnetized flexible member 34 is supported in a generally oval configuration by a retainer 36. The flexible member 34 is formed from a flexible magnet that may be as was described previously for the first embodiment 12 of the magnetic drain plug. The member 34 has at least one exposed magnetic attractive side. FIG. 5 shows a pair of flexible members 34 arranged with their south poles attached to an inner face 38 of the retainer 36. The north poles of the flexible members 34 are thus exposed to attract metallic particles. The flexible members 34 are attached to the retainer 36 by rivets 40, or an equivalent attachment means.

The retainer 36 is formed from ribbon steel and is resiliently flexible along its longitudinal axis so that it may collapse inwardly when the magnetic drain plug 13 is inserted into, or removed from, the threaded opening 27 of the reservoir 22. Once the retainer 36 is inserted through the drain hole 27 it springs back to its original, generally oval, configuration.

The retainer 36 comes in two portions that are connected at one end by a hinge 42, and which are pivotally connected to an arm 44 at the other end by a pin 46. The arm 44 is pivotally connected to one end of a swivel 48, the other end of the swivel 48 being rotatably connected to a threaded drain plug 50.

As shown in FIG. 6, the pivotal connections between the retainer 36 and the arm 44, and between the arm 44 and swivel 48, permit the retainer to rest in a preferred location against the bottom of the reservoir 22 generally beneath the oil intake 30. The swivel 48 allows the drain plug 50 to be threaded into the reservoir opening 27 without rotating the retainer 36.

It can now be appreciated how the swivels 18, 48 of both embodiments of the magnetic drain plug 12, 13 contribute to the instant invention. Once the flexible magnetic member 16 or retainer 36 has been inserted into the drain plug aperture 27, the drain plug 20, 50 itself must be inserted to avoid any unnecessary loss of lubricant or oil from the system. Without the swivel 18, 48 threaded rotation of the drain plug 20, 50 would cause rotation of the flexible member 16 or retainer 36 about a longitudinal axis. For the first embodiment, this would introduce twists into the member 16 and disrupt the easy and relatively automatic positioning of the flexible member 16 around the sump area 29. Twists would greatly distort the magnetic field and thus greatly impair the effectiveness of the invention. Disturbing the positioning of the device relative to the oil intake 30 would also impair its effectiveness. For the second embodiment, the retainer 36 would typically not have sufficient space below the oil pump 31 to rotate. Thus, without the swivel 48, the drain plug 50 could not be threaded fully into the hole 27 to seal the reservoir 22.

It will also be appreciated that the present invention is not only useful for purifying the lubricating fluid but also for indicating that there may be alignment problems in the engine which, with appropriate adjustment, can be corrected before additional wear takes place. In order to serve this latter function it is necessary for the invention to be removable from the reservoir 22 without losing the particles that may have been attracted to and trapped onto the flexible member 16, 34. In the first embodiment 12, three aspects of the structure assist this. First, the attraction of one of sides 16a, 16b of the flexible member 16 to the metal surface of the reservoir 22 means that, upon withdrawal of the member, it will keep a constant orientation. In other words one of the sides (say side 16a) will stay down and the other of the sides (say side 16b), covered with the metallic particles, will stay up. This prevents the particles from being scraped off the flexible member 16 as it is being withdrawn. Second, the swivel 18 ensures that the flexible member 16 does not rotate when the drain plug 20 is being removed, again avoiding a potential loss of collected metallic particles. Third, the flexible member 16 has generally flat sides while the opening 27 is generally circular. Thus, only the edges of the flexible member 16 will come into contact with the sides of the opening 27, so that the particles located on the sides of the member 16 will not be scraped off during removal of the member 16. In the second embodiment of the magnetic drain plug 13, the outer sides of the retainer 36 contact the sides of the opening 27 when the retainer 36 is being withdrawn. The exposed magnetized portions of the flexible member 34 are thus shielded and the captured particles are undisturbed.

Once the member 16 has been removed from the reservoir 22 it may be visually inspected by the owner or a trained mechanic who will be able to assess the volume of particles attached to the member 16, 34 and determine whether a misalignment problem exists. It has been found that the metallic particles may be coated in partially burnt hydrocarbons, or soot, and thus have the resemblance of a thick black grime. This coating on the particles inhibits the effectiveness of the prior art devices, in that a stronger magnetic field than might otherwise be expected is required.

The present invention is easily adjusted to various vehicle makes and models, by simply ensuring that a thread is provided that is compatible to the threaded drain plug opening 27 of the vehicle and by selecting an appropriate length of flexible member 16 or retainer 36 for the particular reservoir configuration. As an aftermarket product it may also be appropriate to provide instructions, on the package or the like, on how to trim the flexible member 16 of the first embodiment 12 to a length that is appropriate. Thus, the longest length required could be sold to be shortened to suit as appropriate depending upon the model that is being worked upon.

OIL PUMP INTAKE

The second aspect of the invention, the oil pump intake, is shown generally at 14 in FIGS. 7-9. A magnetized member 52 is attached to an oil pump intake housing 54 to create a magnetic field 56 (shown in dotted outline in FIG. 9) located precisely around the perimeter of the intake housing 54. The intake housing 54 is hollow and includes upper and lower surfaces 58 and 60. An oil intake port 62 is defined in the lower surface 60 of the housing 54 to receive oil contained within the oil reservoir 22 of an internal combustion engine. A conduit 64 connects the housing 54 to an oil pump 66. Oil is thus drawn through the intake port 62 and conduit 64 to the oil pump 66.

In the preferred embodiment of this aspect of the invention at least a portion of the perimeter of the lower surface 60 of the housing 54 is magnetized in order that the magnetic field 56 may be localized adjacent to the oil intake port 62. As shown in FIGS. 8 and 9, housing 54 may be magnetized by securing the magnetized member 52 about the perimeter of the housing 54. Alternatively, the housing may have an electromagnetic field induced upon it in a manner known to those skilled in the art.

It will be appreciated that the first aspect of the collector 10 (embodiments 12 and 13) is generally preferred over the second aspect (embodiment 14) because of its ease of insertion and inspection after a period of time. In the second aspect of the collector 10, it is necessary to remove the reservoir in its entirety to monitor the collection of particles on the magnetic member 52. This can be a more time consuming and thus more expensive procedure. Further, while locating the magnetic field around the uptake is good to screen most of the fluid lubricant passing up the uptake, locating the magnetic field lower in the pan, to collect particles which may settle out while the system is not in use is expected to result in better performance. It is simply more difficult to extract particles from a turbulent flow than from a still settling reservoir.

In each of the embodiments described above, it has been found that a magnet of 750 Gauss provides an adequate field strength for collecting particles.

It will be appreciated by those skilled in the art that the foregoing description relates to preferred embodiments of the invention and that variations to the invention can be made without departing from the broad scope of the appended claims. Some of these variations have been discussed above and others will be apparent to those skilled in the art. For example, it is most preferred to establish 360° of magnetic field around the oil uptake, as accomplished by, in particular, the embodiment using a retainer. It will be appreciated however that while this is believed to be the most effective configuration, other configurations may also be used, which while falling short of 360° provide some beneficial magnetic separation of particles from the fluid.

I claim:

1. A magnetic collector for insertion into a liquid reservoir of a lubrication system, said magnetic collector comprising:
    a flexible member having a magnetic surface that attracts metallic particles;
    support means for removably supporting said flexible member in said liquid reservoir; and
    a swivel for connecting one end of said flexible member to said support means, said swivel permitting free rotation of said support means relative to said flexible member.

2. A magnetic collector as claimed in claim 1 wherein said support means comprises a threaded drain plug which is compatible with standard liquid reservoir drain plug opening threads.

3. A magnetic collector as claimed in claim 1 wherein said magnetic surface of said flexible member has opposed sides having edges, said edges being configured for passing through a circular opening such that contact between said sides and said opening is limited to said edges.

4. A magnetic collector as claimed in claim 3 wherein the magnetic field established by one of said opposed sides is strong enough to allow said flexible member to attach to a metallic surface in said liquid reservoir, and yet weak enough that the flexible member may slide along said metallic surface to a desired position.

5. A magnetic collector as claimed in claim 4 for use in association with a liquid reservoir having a sump area having curved side edges and an intake port located above said sump area, and wherein said flexible member is sufficiently long that it may be inserted into said sump area and traverse said sump area to at least pass below said intake port.

6. A magnetic collector as claimed in claim 5 wherein said flexible member is sufficiently long and flexible that it may curve along its length to follow said curved side edges of the sump area.

7. A magnetic collector as claimed in claim 1, wherein said flexible member is carried by a flexible retainer.

8. A magnetic collector as claimed in claim 7, wherein said flexible retainer is in the form of a collapsible loop, having one end attached to said swivel.

9. A magnetic collector as claimed in claim 8, wherein said retainer is formed from ribbon steel, and said flexible member is attached to an inside face of said loop.

10. A magnetic collector as claimed in claim 9, wherein said retainer includes an arm extending between said swivel and said loop.

11. A magnetic collector as claimed in claim 10, wherein said arm is pivotally attached to said retainer to facilitate positioning said retainer in a preferred location.

12. An oil pump intake comprising:
    a hollow housing having an upper and a lower surface, said lower surface defining an oil intake port;
    a conduit for fluidly connecting said housing to an oil pump, said conduit receiving oil flow from said oil intake port; and
    a magnetized member extending in at least a partial circle about said oil intake port on said lower surface of said housing, said magnetized member forming a magnetic field that extends across said intake port;
    wherein said housing is adapted to be submerged within the oil contained within an oil reservoir.

13. An oil pump intake as claimed in claim 12 wherein said magnetized member comprises a ferromagnetic member.

14. An oil pump intake as claimed in claim 12, wherein said magnetized member comprises an electromagnetic member.

15. A method of detecting misalignment of motor components, said method comprising the steps of:

inserting a magnetic collector into a lubricant reservoir associated with a motor, said magnetic collector including a magnetic member connected by a swivel to a threaded drain plug for sealing an opening to said reservoir;

positioning said magnetic member in said lubricant reservoir to at least partially surround a lubricant intake port associated with an oil pump;

threading said drain plug into said opening to seal said reservoir without rotationally disturbing the position of said magnetic member relative to said intake port;

allowing said motor to be in use and at rest for alternate periods of time;

removing said magnetic collector from said reservoir without disturbing any metallic debris collected upon said magnetic member;

inspecting said magnetic member for metallic debris; and evaluating said motor for misalignment.

16. The method of claim 15 wherein said step of positioning said member includes trimming said member to an appropriate length prior to inserting said member into said lubricant reservoir.

* * * * *